June 4, 1957 B. MENNESSON 2,794,510
FRICTION ROLLER DRIVE MEANS FOR BICYCLE
HAVING AUXILIARY ENGINE Filed Feb. 28, 1955 2 Sheets-Sheet 1

INVENTOR
Bernard Mennesson
BY
Bailey Stephens and Huettig
ATTORNEYS

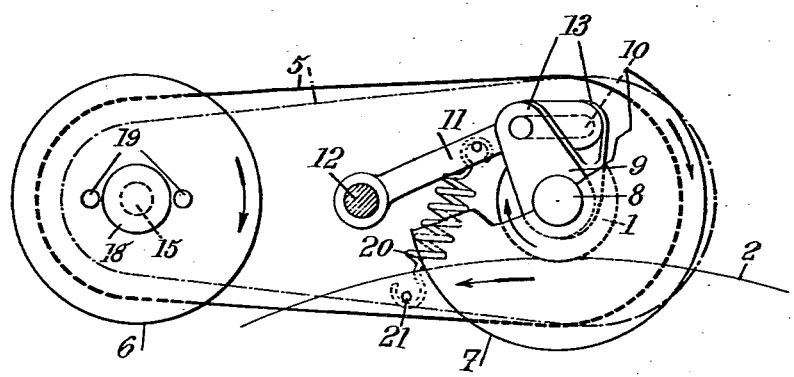
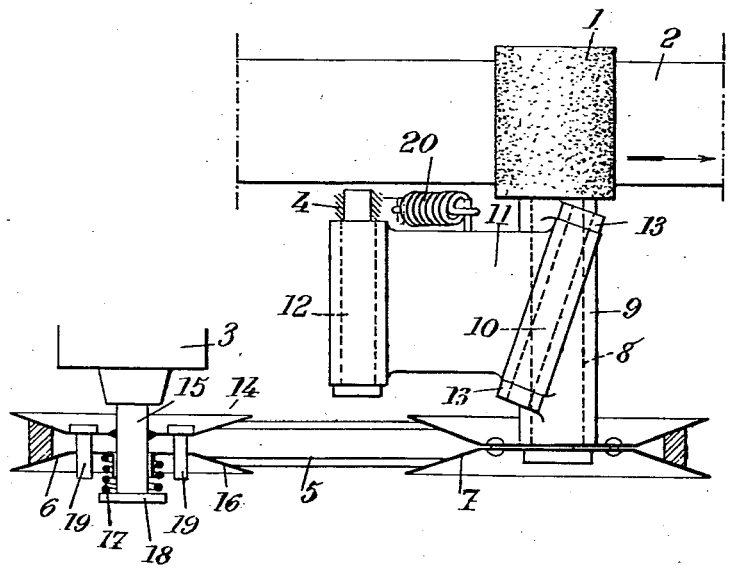

2,794,510
Patented June 4, 1957

2,794,510

FRICTION ROLLER DRIVE MEANS FOR BICYCLE HAVING AUXILIARY ENGINE

Bernard Mennesson, Neuilly-sur-Seine, France, assignor to Societe d'Appareils de Controle et d'Equipement des Moteurs S. A. C. E. M., Neuilly-sur-Seine, France, a society of France Application February 28, 1955, Serial No. 491,167

Claims priority, application France March 6, 1954

3 Claims. (Cl. 180—31)

The present invention relates to light vehicles at least one wheel of which is driven by at least one driving roller running in contact with the tire of said wheel. My invention is more especially although not exclusively concerned with bicycles having an auxiliary engine which is supported by the front fork of the bicycle and drives the front wheel.

The chief object of my invention is to provide a vehicle of this type which is better adapted to meet the requirements of practice.

My invention consists essentially in providing, between the driving shaft of the engine and the shaft of the driving roller in contact with the wheel tire, a transmission including a belt running around a variable diameter driving pulley and a driven pulley, said driven pulley and said roller being carried by a movable element and the characteristics of said element, of said driven pulley and of said roller being such that the resultant of the reaction of the tire on the roller and of the pulling action of the belt tends to increase the distance between the two above mentioned pulleys by displacement of said element against the action of a return device at least partly constituted by an elastic system which itself tends to increase the diameter of the driving pulley.

A preferred embodiment of the present invention will be hereinafter described with reference to the accompanying drawings given merely by way of example and in which:

Fig. 1 diagrammatically shows in elevational view the front part of a bicycle provided with an auxiliary engine and made according to the present invention.

Fig. 2 is an elevational view on an enlarged scale showing the detail of the transmission mechanism of Fig. 1.

Fig. 3 is a plan view corresponding to Fig. 2.

Figure 1:
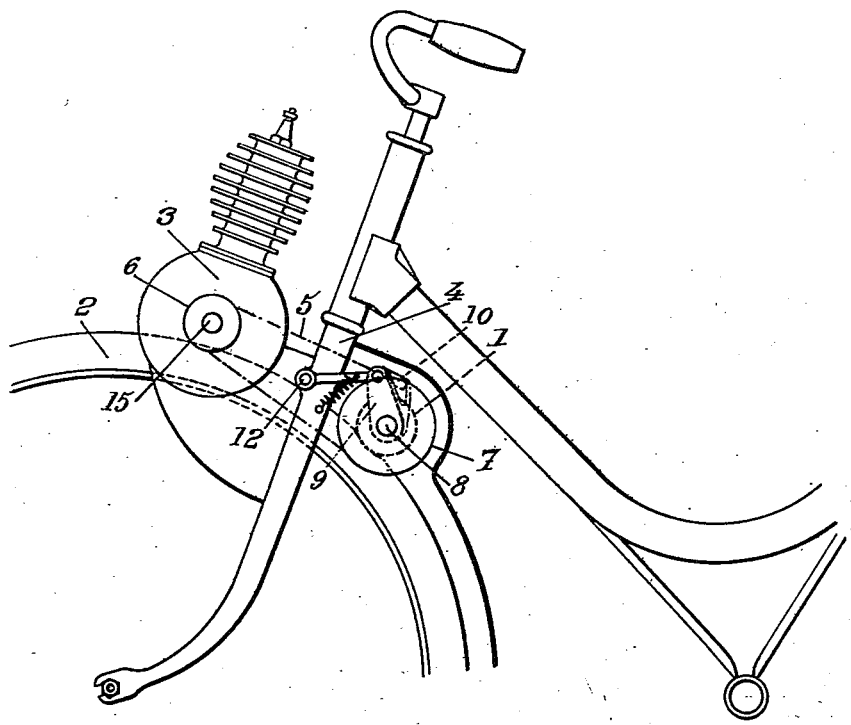

The bicycle shown by the drawings has its front wheel driven by roller 1 running in contact with the tire 2 of this wheel, this roller being itself driven by an engine 3 supported by the front fork 4 of the bicycle.

To transmit the drive from engine 3 to roller 1, I provide a belt 5 (Fig. 1) connecting a driving pulley 6 of resiliently variable diameter with a driven pulley 7. Said pulley 7 and roller 1 are carried by a movable element and the characteristics of this element, of the driven pulley and of the roller are such that the resultant of the reaction exerted by the tire on the roller and of the driving action of belt 5 tends to increase the distance between the axes of pulleys 6 and 7 by displacement of the above mentioned movable element against the action of a return device constituted at least partly by a resilient system tending to increase the diameter of the driving pulley.

In this way, the transmission ratio from the engine to the driving wheel of the bicycle is automatically adjusted to the resistant torque (or driving torque required to drive the bicycle), and the engine is used in the best possible conditions when said resistant torque varies.

Although such an arrangement is very advantageous in itself, it is preferable to provide it with supplementary resilient means tending to move the movable element which carries the driven pulley 7 and roller 1 in a direction which both applies the roller against the tire and tends to increase the distance between the axes of pulleys 6 and 7.

In the embodiment of my invention illustrated by the drawings, the driven pulley 7 and roller 1 (which is of a diameter considerably smaller than that of said driven pulley 7) are both fixed on a shaft 8 (Figs. 2 and 3) journalled in a movable element 9 which includes a sleeve surrounding said shaft 8. Element 9 is pivotable about a spindle 10 the ends of which are engaged in holes provided in lugs 13 belonging to element 9. The intermediate portion of spindle 10 is journalled in one of the ends of a rod 11 the other end of which is pivoted about a fixed pivot member 12 which has a horizontal axis and is carried by the fork 4 of the bicycle. Spindle 13 is substantially transverse to the middle plane of the wheel, this plane being the plane of symmetry of tire 2, perpendicular to the axis of roller 1.

Belt 5, of trapezoidal shape, engages the variable diameter driving pulley 6 which is constituted by two frusto-conical portions movable axially with respect to each other. One of these portions 14 is for instance fixed with respect to the driving shaft 15 of the engine and the other portion 16 is movable axially with respect to said shaft so as to be able to move away or toward part 14 (thus reducing or increasing the effective diameter of driving pulley 6). Resilient means constituted by a spring 17 urge part 16 toward part 14. As shown, this spring is interposed between part 16 and a shoulder 18 rigid with shaft 15. In order to prevent parts 14 and 16 from rotating with respect to each other, I provide driving fingers 19.

The resilient system for applying roller 1 against tire 2 may be constituted by a spring 20 one end of which is fixed to rod 11 and the other one to a point 21 of the front fork of the bicycle. Such a spring of course tends to increase the distance between the axes of pulleys 6 and 7 and also serve to tension belt 5.

The driven pulley 7 may have a variable diameter and in this case it is easy to keep belt 5 constantly in a plane parallel to a given longitudinal plane when the diameters of the pulleys vary. If pulley 7 is made of fixed diameter, means must be provided to keep belt 5 constantly in a plane parallel to a given longitudinal plane, whatever be the displacement of the movable portion 16 of the driving pulley.

For this purpose, spindle 10 about which movable part 9 is pivoted is oblique to shaft 8. Preferably, spindle 10 is located in a plane substantially parallel to the plane tangent to roller 1 at the middle point of its area of contact with the tire. Thus, when the distance between the axes of the pulleys increases, the driven pulley 7 is given a displacement one component of which is parallel to the displacement of the movable portion 16 of the driving pulley.

Such a transmission device works as follows:

If the driving torque required to drive the bicycle is relatively low (when the vehicle is running on a flat road or down a hill), the efforts transmitted by the belt are relatively small and the effect of spring 17 overcomes the resistances so that portions 14 and 15 of the driving pulley are applied against each other. In these conditions, the speed of the vehicle is maximum (this is the position shown partly in solid lines and partly in dotted lines on Fig. 2).

If a higher driving torque is required (for instance if the vehicle is running up a hill), the roller running on the tire comes to move in the direction which increases the distance between the axes of the driving and driven pulleys. Thus, roller 1, shaft 8, driven pulley 7 and movable element 9 are displaced in this direction. Owing to a suitable choice of the dimensions and characteristics of these elements, and in particular owing to a suitable choice of spring 17, the pull exerted on the belt in the direction opposed to its driving direction, causes pulley portions 14 and 16 to move away from each other, thus reducing the effective diameter of this pulley and increasing the ratio of transmission (position shown in dot-and-dash lines on Fig. 2). If now the resistant torque decreases, the opposed effect takes place.

In all cases, the ratio of transmission is automatically given the optimum value.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A light vehicle which comprises, in combination, a frame, at least one fork carried by said frame, a wheel journalled in said fork, a pneumatic tire on said wheel, an internal combustion engine carried by said fork, said engine having a driving shaft, a pulley mounted on said shaft including a fixed frusto-conical part rigid with said shaft and another frusto-conical part opposed to said first mentioned part and slidably mounted on said shaft, and means for interconnecting said two pulley parts for rotation of the second one together with the first one, the frusto-conical surfaces of said parts diverging toward the outside, spring means interposed between said shaft and said second mentioned pulley part for urging said pulley part toward the first mentioned pulley part, a rod pivoted to said fork about an axis parallel to said engine shaft, an element pivoted to said rod about an axis substantially transverse to the middle plane of said wheel, a shaft journalled in said element about an axis parallel to said engine shaft, a pulley carried by said last mentioned shaft, and a roller carried by said last mentioned shaft and in contact with said tire, a belt extending around both of said pulleys, means interposed between said fork and said shaft, said means including a spring, for urging said shaft away from said first mentioned pulley, in a direction such that said roller is applied against said tire.

2. A light vehicle which comprises, in combination, a frame, at least one fork carried by said frame, a wheel journalled in said fork, a pneumatic tire on said wheel, an internal combustion engine carried by said fork, said engine having a driving shaft, a pulley mounted on said shaft including a fixed frusto-conical part rigid with said shaft and another frusto-conical part opposed to said first mentioned part and slidably mounted on said shaft, and means for interconnecting said two pulley parts for rotation of the second one together with the first one, the frusto-conical surfaces of said parts diverging toward the outside, spring means interposed between said shaft and said second mentioned pulley part for urging said pulley part toward the first mentioned pulley part, a rod pivoted to said fork about an axis parallel to said engine shaft, an element pivoted to said rod about an axis substantially transverse to the middle plane of said wheel, a shaft journalled in said element about an axis parallel to said engine shaft, a pulley carried by said last mentioned shaft, a roller carried by said last mentioned shaft and in contact with said tire, a belt extending around both of said pulleys, and resilient means interposed between said fork and said rod for urging said rod in the direction which tends to increase the distance between the axes of said two pulleys and to apply said roller against said tire.

3. A light vehicle which comprises, in combination, a frame, at least one fork carried by said frame, a wheel journalled in said fork, a pneumatic tire on said wheel, an internal combustion engine carried by said fork, said engine having a driving shaft, a pulley mounted on said shaft including a fixed frusto-conical part rigid with said shaft and another frusto-conical part opposed to said first mentioned part and slidably mounted on said shaft, and means for interconnecting said two pulley parts for rotation of the second one together with the first one, the frusto-conical surfaces of said parts diverging toward the outside, spring means interposed between said shaft and said second mentioned pulley part for urging said pulley part toward the first mentioned pulley part, a rod pivoted to said fork about an axis parallel to said engine shaft, an element pivoted to said rod about an axis oblique to said engine shaft and to the middle plane of said wheel, a shaft journalled in said element about an axis parallel to said engine shaft, a pulley carried by said last mentioned shaft, a roller carried by said last mentioned shaft and in contact with said tire, a belt extending around both of said pulleys, and resilient means interposed between said fork and said rod for urging said rod in the direction which tends to increase the distance between the axes of said two pulleys and to apply said roller against said tire.

References Cited in the file of this patent

UNITED STATES PATENTS

| 2,487,002 | Thomas | Nov. 1, 1949 |

FOREIGN PATENTS

| 1,051,549 | France | Sept. 16, 1953 |
| 88,984 | Switzerland | Apr. 16, 1921 |